United States Patent
Zhu

(10) Patent No.: US 7,289,418 B2
(45) Date of Patent: Oct. 30, 2007

(54) OPTICAL DISK WITH ERASABLE SURFACE AND MANUFACTURING METHOD THEREOF

(75) Inventor: Jinghua Zhu, Guangzhou (CN)

(73) Assignee: Kuan-I Hsu, Taoyuan (TW)

( * ) Notice: Subject to any disclaimer, the term of this patent is extended or adjusted under 35 U.S.C. 154(b) by 818 days.

(21) Appl. No.: 10/769,632

(22) Filed: Jan. 30, 2004

(65) Prior Publication Data

US 2005/0094544 A1 May 5, 2005

(30) Foreign Application Priority Data

Nov. 5, 2003 (CN) .................. 2003 1 0112023

(51) Int. Cl.
*G11B 7/24* (2006.01)

(52) U.S. Cl. .................. 369/275.2; 369/275.3; 428/694 ML

(58) Field of Classification Search .. 369/275.1–275.5, 369/283, 286, 280, 277, 94, 13.07, 13.04, 369/288; 428/64.1–64.6, 694 ML, 694 MM, 428/694 DE See application file for complete search history.

(56) References Cited

U.S. PATENT DOCUMENTS 5,726,970 A * 3/1998 Kaneko et al. .......... 369/275.2

* cited by examiner

*Primary Examiner*—Ali Neyzari
(74) *Attorney, Agent, or Firm*—James J. Zhu; Perkins Coie LLP

(57) ABSTRACT

An optical disk with an erasable surface of the present invention includes a transparent substrate, a recording layer, and a reflective layer, and an erasable writing layer. The recording layer is formed between the transparent substrate and the reflective layer, and the reflective layer is formed between the recording layer and the erasable writing layer. The optical disk may further include a protective layer, and the protective layer is formed between the erasable writing layer and the reflective layer. The invention also discloses a method of manufacturing such optical disk.

10 Claims, 2 Drawing Sheets

OPTICAL DISK WITH ERASABLE SURFACE AND MANUFACTURING METHOD THEREOF

CROSS-REFERENCE TO RELATED APPLICATION

This application claims priority to Chinese Application No. 200310112023.3, filed Nov. 5, 2003, the disclosure of which is incorporated by reference in its entirety including drawings.

FIELD OF THE INVENTION

The present invention is related to an optical recording medium and manufacture method thereof, and more particularly to an optical disk with an erasable surface.

BACKGROUND OF THE INVENTION

Digital versatile disk (DVD) is developed from the traditional CD-ROM and has the same dimension thereof. It can be utilized to store various kinds of data information, such as music, video and general digital data. The data information stored in DVD has a higher quality than that in traditional recording medium. Additionally, the capacity of DVD becomes larger and larger because of the reduction of the track width and the change of the recording manner.

Referring to FIG. 1, in the prior art, a single-sided DVD can store a high quality film more than 135 minutes which has a capacity of 4.7 GB. The capacity is equal to that 7 times of a traditional CD, however, the dimension of DVD is same to that of the CD. Additionally, DVD can be classified as DVD with one-root directory and DVD with two-root directory. DVD with one root directory has a capacity of 4.7 GB. Though a single-sided DVD with two-root directory records data in one side, but it can attain two-layer recording by utilizing two different root directory. Thus, the capacity of a single-sided DVD can be 8.5 GB.

However, the optical disk is very difficult to write and record some useful information thereon and such writing is not erasable due to its surface character.

Hence it is desired to provide an optical disk with an erasable surface and manufacturing method thereof that can overcome the foregoing drawbacks of the prior art.

SUMMARY OF THE INVENTION

A main object of the present invention is to provide an optical disk with an erasable surface and manufacturing method thereof.

To achieve the above-mentioned object, an optical disk with an erasable surface comprises: a transparent substrate, a recording layer, and a reflective layer, and an erasable writing layer. In the present invention, the recording layer is formed between the transparent substrate and the reflective layer, and the reflective layer is formed between the recording layer and the erasable writing layer.

In the present invention, the recording layer has a structure of one-root directory or two-root directory. The optical disk may further include a protective layer, and the protective layer is positioned between the erasable writing layer and the reflective layer. The transparent substrate can be made of polycarbonate and the recording layer consists of organic coloring substances which comprise a composition of an cyanine compound or an azo dye.

A method of manufacturing an optical disk with an erasable surface comprises the sequential steps of: (1) mounting a mother disk of DVD on a mold of a molding machine; (2) forming a transparent substrate by injection molding; (3) forming a recording layer on the transparent substrate formed in step (2); (4) forming a reflective layer on the recording layer formed in step (3); (5) forming an erasable writing layer on the reflective layer formed in step (4).

In the present invention, the method further includes a step of forming a protective layer between the reflective layer and the erasable writing layer. The recording layer is formed by spin coating, and the reflective layer is formed by sputter coating. The method further includes a step of producing two-root directory in the optical disk. The optical disk is selectively from DVD, CD and VCD.

For the purpose of making the invention easier to understand, one particular embodiment thereof will now be described with reference to the appended drawings in which:

DETAILED DESCRIPTION OF THE INVENTION

Figure 1:
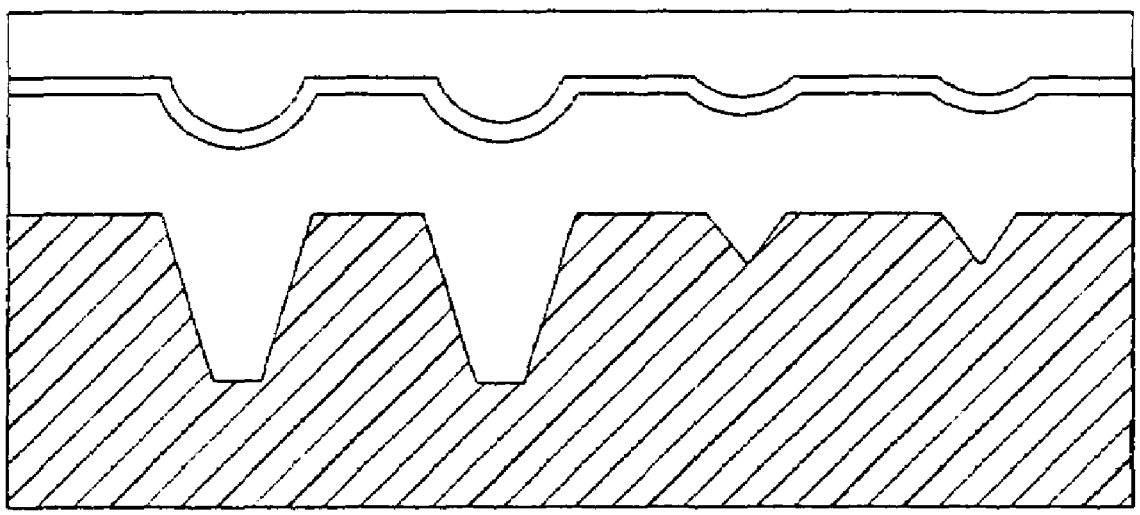
FIG. 1 is a cross-sectional view of a traditional single-sided optical disk.
Figure 2:
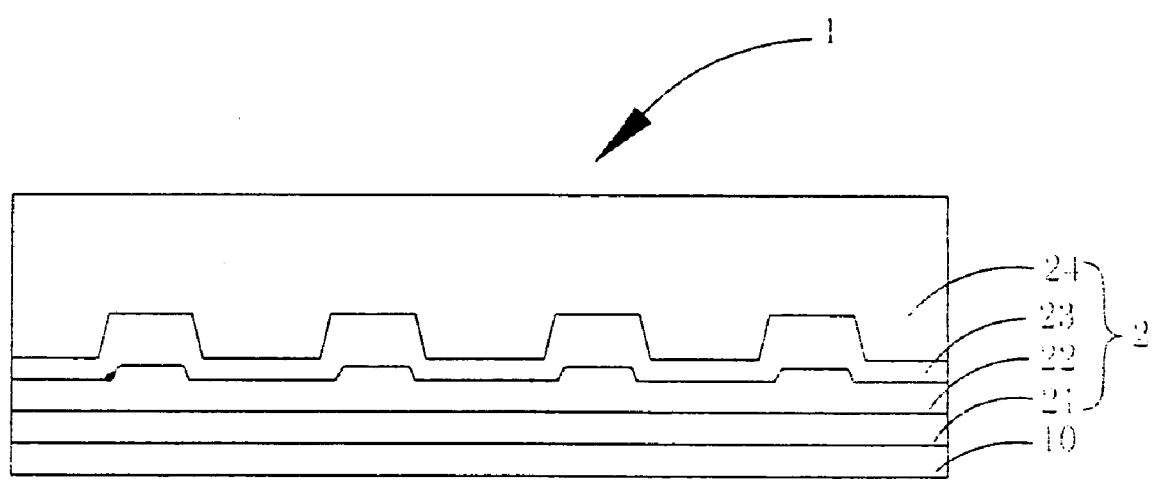
FIG. 2 is a cross-sectional view of an optical disk with an erasable surface according to an embodiment of the present invention.

Referring now to the drawings in detail, FIG. 2 shows an optical disk (such as a DVD) with an erasable surface according to an embodiment of the present invention. The optical disk comprises a transparent substrate 24, a recording layer 23 formed on the transparent substrate 24, and a reflective layer 22 on the recording layer 23. In the present invention, the optical disk further includes an erasable writing layer 10 on the reflective layer 22. The erasable writing layer 10 is made of a kind of plastic with the exception of polycarbonate (PC).

Preferably, the optical disk also have a protective layer 21 formed between the reflective layer 22 and the erasable writing layer 10. The optical disk of the present invention is suitable for optical recording with a laser beam having a short wavelength, specifically a wavelength of 635-650 nm. The recording layer can be a structure of one-root directory, or two-root directory.

A method of manufacturing the optical disk with an erasable surface of the present invention comprises the sequential steps: first, mounting a mother disk of DVD on a mold of a molding machine, then forming a transparent substrate 24 by injection molding, after that, forming a recording layer 23 on the transparent substrate 24 by spin coating. Subsequently, forming a reflective layer 22 on the recording layer 23 by sputter coating. At Last, forming an erasable writing layer 10 on the reflective layer 22 and an optical disk with an erasable surface of the present invention is thus attained.

In the present invention, the method further includes a step of forming a protective layer 21 between the reflective layer 22 and the writing layer 10. The transparent substrate 24 is made of polycarbonate (PC) and the recording layer 23 is consisted of organic coloring substances which comprises a composition of an cyanine compound or an azo dye.

In the above-mentioned process, different optical disks with an erasable surface can be produced. For example, the optical disks can selectively be a DVD-R or DVD R/W which have a thickness of 0.6 mm, or a DVD-5 or DVD-9.

Because the optical disk with an erasable surface has an erasable writing layer 10, some useful information can be written and recorded on the optical disk so as to make the usage and management of the optical disks very convenient. At the same time, the optical disk, especially for DVD, not only more than the capacity of CD-ROM (about 650 MB), but also more than the capacity of a hard disk (about 2 GB to 4 GB). That is to say, for DVD having an erasable surface and one-root directory recording layer, it has a capacity of 4.7 GB; in case of DVD having an erasable surface with two-root directory recording layer, it has a capacity of 8.5 GB. In addition, the optical disk can be classified as single-layer read/write optical disk and two-layer read/write optical disk.

It is very obvious that the optical disks, such as VCD CD, also can form an erasable writing layer 10 and then attain an erasable function. The method of manufacturing such optical disks is very similar to that of DVD, a detailed description of such method is thus omitted.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. An optical disk with an erasable surface comprises:
   a transparent substrate, a recording layer, a reflective layer, and an erasable writing layer; wherein
   the recording layer is formed between the transparent substrate and the reflective layer, and the reflective layer is formed between the recording layer and the erasable writing layer.

2. The optical disk with an erasable surface according to claim 1, wherein the optical disk further includes a protective layer, and the protective layer is formed between the erasable writing layer and the reflective layer.

3. The optical disk with an erasable surface according to claim 2, wherein the transparent substrate is made of polycarbonate and the recording layer is consisted of organic coloring substances which comprise a composition of an cyanine compound or an azo dye.

4. The optical disk with an erasable surface according to claim 3, wherein the recording layer is a structure of one-root directory.

5. The optical disk with an erasable surface according to claim 3, wherein the recording layer is a structure of two-root directory.

6. A method of manufacturing an optical disk with an erasable surface comprises the steps of:
   (1) mounting a mother disk of DVD on a mold of a molding machine;
   (2) forming a substrate by injection molding;
   (3) forming a recording layer on the substrate formed in step (2);
   (4) forming a reflective layer on the recording layer formed in step (3);
   (5) forming an erasable writing layer on the reflective layer formed in step (4).

7. The method of manufacturing an optical disk with an erasable surface of claim 6, wherein the method further includes a step of forming a protective layer between the reflective layer and the erasable writing layer.

8. The method of manufacturing an optical disk with an erasable surface of claim 7, wherein the recording layer is formed by spin coating, and the reflective layer is formed by sputter coating.

9. The method of manufacturing an optical disk with an erasable surface of claim 8, wherein the method further includes a step of producing two-root directory on the optical disk.

10. The method of manufacturing an optical disk with an erasable surface of claim 6, wherein the optical disk is selectively from DVD, CD and VCD.

* * * * *